United States Patent Office 3,516,909
Patented June 23, 1970

3,516,909
FERMENTATIVE BIOSYNTHESIS OF
TETRACYCLINE ANTIBIOTICS
Harlow Bishop, Nanuet, N.Y., assignor to American Cyanamid Company, Stamford, Conn., a corporation of Maine
No Drawing. Continuation-in-part of application Ser. No. 624,132, Mar. 20, 1967. This application Aug. 8, 1967, Ser. No. 659,005
Int. Cl. C12d 9/18
U.S. Cl. 195—102
8 Claims

ABSTRACT OF THE DISCLOSURE

This disclosure describes a process for the production of tetracycline antibiotics by cultivating a tetracycline antibiotic-producing strain of a species of the genus Streptomyces in a substantially triglyceride oil-free medium containing oleyl alcohol.

CROSS REFERENCE TO RELATED APPLICATION

This application is a continuation-in-part of my co-pending application Ser. No. 624,132, filed Mar. 20, 1967 and now abandoned.

BRIEF SUMMARY OF THE INVENTION

This invention relates to a novel process of producing antibiotics of the tetracycline series and, more particularly, is concerned with an improved process for the production of tetracycline, 7-chlorotetracycline, 5-hydroxytetracycline, 7-chloro-6-demethyltetracycline or 6-demethyltetracycline by fermenting strains of species of Streptomyces, which produce these antibiotics, in a substantially triglyceride oil-free medium containing oleyl alcohol.

DETAILED DESCRIPTION OF THE INVENTION

At present, conventional fermentation media for the production of tetracycline antibiotics contain triglyceride oils as one of the nutrient sources, as is set forth in U.S. Pats. No. 2,482,055, 2,878,289 and 2,911,339. However, the use of triglyceride oils as a nutrient source has presented numerous difficult problems. For example, a triglyceride oil is hydrolyzed to a free fatty acid to an appreciable extent during the fermentation process and, as a consequence of the high calcium ion content of the media, causes the formation of undesirable calcium soaps. When these fatty acids are in the form of a soap they are no longer available to the organism as a nutrient, so that a considerable excess of triglyceride oil must be employed to compensate for the nutrient oil which is bound in the form of a calcium soap. In addition, the presence of calcium soaps in the fermentation mash causes serious difficulties during the refining process. Also, triglyceride oils require the addition of antioxidants to prevent rancidity. Most important, however, is the fact that triglyceride oils are quite variable in composition and consequently result in variable yields when employed as a fermentation nutrient source. With some lots of triglyceride oil, the yields of tetracycline antibiotic may be reduced to half those normally obtained with a good lot of triglyceride oil. Lard oil, in particular, is notorious as being subject to wide variations in composition due to the ability of the hog to assimilate ingested fat with little change in its component fatty acids.

The present invention is based upon the surprising discovery that the concomitant substantial elimination of triglyceride oils and addition of oleyl alcohol provides a fermentation medium which is markedly superior to the conventional fermentation media using triglyceride oils as a primary nutrient source. The problems of variable yields, nutrient rancidity, and difficulty of purification are thus completely overcome with no diminution of antibiotic yield of any consequence since the oleyl alcohol is an effective nutrient substitute for the triglyceride oils.

Heretofore, as sources of triglyceride oils, it has been customary in the art to use such materials as:

| Lard oil | Palm oil |
| Fish oil | Cottonseed oil |
| Soybean oil | Linseed oil |
| Safflower oil | Peanut oil |
| Coconut oil | Sunflower oil |

It has now been found, in accordance with the present invention, that superior results are obtained by avoiding the use of these materials in favor of the use of oleyl alcohol in the preparation of fermentation media. The amount of oleyl alcohol employed may vary from about 0.1% to about 8.0% by volume of the fermentation medium. More oleyl alcohol can be used but ordinarily the improvement beyond 8.0% is not very great. The preferred amount of oleyl alcohol employed, however, is from about 0.5% to about 5.0% by volume of the fermentation medium. The oleyl alcohol need not be employed in a high degree of purity but oleyl alcohol having less than about 25% by weight of impurities is generally preferred. By a substantially triglyceride oil-free medium is meant a fermentation medium containing no more than 5 grams per liter of triglyceride oil.

The advantages of using oleyl alcohol in place of triglyceride oils in fermentation media are numerous and important. For example, oleyl alcohol is avidly utilized and is not converted to free fatty acids during fermentation and therefore no calcium soaps are formed. For this reason, far less oleyl alcohol than triglyceride oils is required in a fermentation medium and the isolation of the tetracycline antibiotic is not complicated by the presence of calcium soaps. Oleyl alcohol does not turn rancid upon storage and hence the use of antioxidants is unnecessary. Most important of all, since oleyl alcohol is a single compound rather than a mixture of variable compositions, more uniform results can be obtained by its use.

The present invention is not particularly concerned with any specific microorganisms except to the extent that it is concerned with those microorganisms that produce the aforementioned tetracycline antibiotics by fermentative biosynthesis. Insofar as is presently known, all such microorganisms are of the genus Streptomyces and typical species which may be employed are, for example, S. aureofaciens, S. rimosus, S. platensis, S. hygroscopicus, and the like. Typical strains of these species which may be employed are, for example:

S. aureofaciens:
    ATCC 10762i
    ATCC 12416a
    ATCC 12551
    ATCC 12748
    ATCC 13911
    NRRL 2209
S. rimosus:
    ATCC 10970
    NRRL 3098
S. platensis—NRRL 2364
S. hygroscopicus—NRRL 3015

The conditions of the fermentation for the tetracycline antibiotics are generally the same as the presently known methods of producing these antibiotics by fermentation. That is, the fermentation medium contains the usual nutrient sources and mineral substances. Suitable carbohydrate nutrient sources include starch, dextrose, cane sugar, glucose, molasses, and the like. Suitable nitrogen sources include yeast, corn steep liquor, ammonium sulfate, urea, ammonium chloride, and the like. Buffer salts may include calcium carbonate and potassium dihydrogen phosphate. Various trace elements such as manganese, cobalt, zinc, iron and the like may be employed.

The other general conditions of the fermentation such as hydrogen ion concentration, temperature, time, rate of aeration, preparation of the inoculum, sterilization, inoculation, and the like are conventional and may be similar to those for the production of 7-chlorotetracycline shown in U.S. Pat. No. 2,482,055 to Duggar and for the production of tetracycline shown in U.S. Pat. No. 2,734,018 to Minieri et al.

Similarly, the recovery of the tetracycline antibiotics from the fermentation liquors is conventional and need not be described as numerous methods of recovering the tetracycline antibiotics from fermentation liquors have been published.

The invention will be described in greater detail in conjunction with the following specific examples.

Example 1.—Comparative study of oleyl alcohol and lard oil in the production of tetracycline An inoculum of *Streptomyces aureofaciens* strain ATCC 13911 was prepared using the procedures described in Example 1 of U.S. Pat. No. 3,092,556.

A fermentation medium of the following composition was prepared:

Corn flour—14.5 grams
Corn starch—47 grams
Cornsteep liquor—25 grams
$CaCO_3$—9 grams
$(NH_4)_2SO_4$—5.6 grams
$NnSO_4$ (70%)—60 milligrams
$CoCl_2 \cdot 6H_2O$—5 milligrams
Ammonium chloride—1.7 grams
Water q.s. to 1000 milliliters.

This fermentation medium was dispensed in an appropriate amount into a series of flasks. Lard oil was added in varying amounts to approximately one-third of the flasks. Oleyl alcohol (Source I—Lachat Chemicals, A360B) was added in varying amounts to a second group of approximately one-third of the flasks. Oleyl alcohol (Source II—Michel & Co., Cachalot 0–3B) was added in varying amounts to a third group of approximately one-third of the flasks. A few of the flasks were retained as blanks (i.e., no lard oil or oleyl alcohol was added). All of the flasks were sterilized, inoculated with the *S. aureofaciens* ATCC 13911 inoculum and incubated at 25° C. on a rotary shaker for 162 hours. The mash was then assayed for tetracycline content. The results appear in Table I below.

TABLE I

| Ingredient added | Amount of Ingredient in percent | Concentration of tetracycline in mcg./ml. |
|---|---|---|
| None | None | 2,974 |
| Lard oil | 0.5 | 3,105 |
| Do | 1.0 | 3,470 |
| Do | 2.0 | 3,580 |
| Do | 3.0 | 4,180 |
| Do | 4.0 | 4,260 |
| Do | 5.0 | 4,250 |
| Oleyl alcohol (Source I) | 0.5 | 3,790 |
| Do | 1.0 | 3,760 |
| Do | 2.0 | 4,160 |
| Do | 3.0 | 3,420 |
| Do | 4.0 | 3,340 |
| Do | 5.0 | 3,300 |
| Oleyl alcohol (Source II) | 0.5 | 4,500 |
| Do | 1.0 | 4,640 |
| Do | 2.0 | 4,920 |
| Do | 3.0 | 4,350 |
| Do | 4.0 | 4,923 |
| Do | 5.0 | 2,500 |

Example 2.—Comparative study of oleyl alcohol and lard oil in the production of 7-chloro-6-demethyltetracycline Spores of *S. aureofaciens* strain ATCC 12551 were washed from an agar slant with sterile distilled water to form a suspension containing 60 million to 80 million spores per ml. A 0.33 ml. portion of this suspension was used to inoculate an 8-inch shaker tube containing 8 ml. of the inoculum medium described in Example 1. The balance of the experiment was performed exactly as described in Example 1 with the one exception of inoculating the fermentation flasks with the *S. aureofaciens* ATCC 12551 inoculum. The harvest mash was assayed for 7-chloro-6-demethyltetracycline. The results appear in Table II below.

TABLE II

| Ingredient added | Amount of ingredient in percent | Concentration of 7-chloro-6-demethyltetracycline in mcg./ml. |
|---|---|---|
| None | None | 660 |
| Lard oil | 0.5 | 820 |
| Do | 1.0 | 810 |
| Do | 2.0 | 920 |
| Do | 3.0 | 990 |
| Do | 4.0 | 975 |
| Do | 5.0 | 925 |
| Oleyl alcohol (Source I) | 0.5 | 885 |
| Do | 1.0 | 870 |
| Do | 2.0 | 890 |
| Do | 3.0 | 850 |
| Do | 4.0 | 740 |
| Do | 5.0 | 765 |
| Oleyl alcohol (Source II) | 0.5 | 1,025 |
| Do | 1.0 | 975 |
| Do | 2.0 | 915 |
| Do | 3.0 | 905 |
| Do | 4.0 | 805 |
| Do | 5.0 | 580 |

Example 3.—Comparative study of oleyl alcohol and lard oil in the production of 7-chlorotetracycline Spores of *S. aureofaciens* strain S–77 were washed from an agar slant with sterile distilled water to form a suspension containing 60 million to 80 million spores per ml. A 0.33 ml. portion of this suspension was used to inoculate an 8-inch shaker tube containing 8 ml. of the inoculum medium described in Example 1. The balance of the experiment was performed exactly as described in Example 1 with the one exception of inoculating the fermentation flasks with the *S. aureofaciens* S–77 inoculum. The harvest mesh was assayed for 7-chlorotetracycline. The results appear in Table III below.

TABLE III

| Ingredient added | Amount of ingredient in percent | Concentration of 7-chlorotetracycline in mcg./ml. |
|---|---|---|
| None | None | 2,975 |
| Lard oil | 0.5 | 5,890 |
| Do | 1.0 | 5,185 |
| Do | 2.0 | 5,265 |
| Do | 3.0 | 5,130 |
| Do | 4.0 | 5,535 |
| Do | 5.0 | 5,935 |
| Oleyl alcohol (Source I) | 0.5 | 4,390 |
| Do | 1.0 | 4,335 |
| Do | 2.0 | 4,900 |
| Do | 3.0 | 4,590 |
| Do | 4.0 | 4,355 |
| Do | 5.0 | 4,535 |
| Oleyl alcohol (Source II) | 0.5 | 5,025 |
| Do | 1.0 | 5,025 |
| Do | 2.0 | 5,205 |
| Do | 3.0 | 6,090 |
| Do | 4.0 | 5,985 |
| Do | 5.0 | 5,140 |

Example 4.—Comparative study of oleyl alcohol and lard oil in the production of 5-hydroxytetracycline Spores of *Streptomyces rimosus* strain NRRL 3098 were washed from an agar slant with sterile distilled water to form a suspension containing 60 million to 80 million spores per ml. A 0.33 ml. portion of this suspension was used to prepare an inoculum of the *S. rimosus* strain as described in Example 1.

A fermentation medium of the following composition was prepared:

(NH$_4$)$_2$SO$_4$—8.0 grams
CaCO$_3$—10.0 grams
NH$_4$Cl—1.5 grams
MgCl$_2$·6H$_2$O—2.0 grams
FeSO$_4$·7H$_2$O—60 milligrams
ZnSO$_4$·7H$_2$O—100 milligrams
CoCl$_2$·6H$_2$O—5 milligrams
MnSO$_4$·4H$_2$O—50 milligrams
Corn starch—55 grams
KCl—1.28 grams
H$_3$PO$_4$ (85%)—240 milligrams
l-Histidine—800 milligrams
Water q.s. to 1000 milliliters This fermentation medium was dispensed in an appropriate amount into a series of flasks. Lard oil was added in varying amounts to approximately one-half of the flasks. Oleyl alcohol was added in varying amounts to the other approximate half of the flasks. A few flasks were retained as blanks (i.e., no lard oil or oleyl alcohol was added.) All of the flasks were sterilized, inoculated with the *S. rimosus* NRRL 3098 inoculum and incubated at 28° C. on a rotary shaker for 162 hours. The mash was then assayed for 5-hydroxytetracycline content. The results appear in Table IV below.

TABLE IV

| Ingredient added | Amount of ingredient in percent | Concentration of 5-hydroxytetracycline in mcg./ml. |
| --- | --- | --- |
| None | None | 1,510 |
| Lard oil | 0.5 | 1,720 |
| Do | 1.0 | 2,320 |
| Do | 1.5 | 2,290 |
| Do | 2.0 | 2,340 |
| Do | 2.5 | 2,330 |
| Do | 3.0 | 2,460 |
| Do | 3.5 | 2,950 |
| Do | 4.0 | 3,150 |
| Do | 4.5 | 3,100 |
| Do | 5.0 | 3,040 |
| Oleyl alcohol (Source II) | 0.5 | 1,810 |
| Do | 1.0 | 1,800 |
| Do | 1.5 | 2,310 |
| Do | 2.0 | 2,310 |
| Do | 2.5 | 2,620 |
| Do | 3.0 | 2,910 |
| Do | 3.5 | 2,650 |
| Do | 4.0 | 2,580 |
| Do | 4.5 | 2,400 |
| Do | 5.0 | 2,940 |

Example 5.—Comparison of filtration rates between fermentation mashes containing oleyl alcohol and lard oil The procedure of Example 3 was repeated with the exception that the flasks containing the fermentation medium were divided into two groups. Sufficient lard oil to provide a final concentration of 2.22% was added to one group. Sufficient oleyl alcohol to provide a final concentration of 2.22% was added to the second group. The fermentation was completed as described in Example 3. The whole harvest mash from each group was separately pooled. Both pooled mashes were adjusted to pH 1.5 with 25% sulfuric acid and agitated for 30 minutes. A measured volume of a 2% aqueous suspension of diatomaceous earth was used to precoat a Test Leaf Filter. A portion of one of the acidified mashes was passed through the filter. The filter was cleaned and again precoated with the same volume of 2% diatomaceous earth suspension. A portion of the other acidified mash was passed through this filter. A comparison of the filtration rates (Table V) shows an improvement in the rate when oleyl alcohol is used.

TABLE V

| Mash ingredient | Percent of ingredient in mash | Filtration rate calculated in gallons per hour per square foot of filter surface |
| --- | --- | --- |
| Oleyl alcohol | 2.22 | 2.81 |
| Lard oil | 2.22 | 1.84 |

Example 6.—Utilization of oleyl alcohol during a conventional fermentation

A 40 ml. portion of fermented broth, prepared as described in Example 3 was acidified to pH 2 with concentrated hydrochloric acid and extracted with petroleum ether. The extract was chromatographed at 200° C. on a 3 foot glass column, ¼ inch in diameter, containing 10% Apiezon L® supported on Chromosorb W® and the composition of the effluent vapor was determined by means of a flame detector. By this procedure it was found that broth containing 3% oleyl alcohol before fermentation contained only 0.21% oleyl alcohol after a seven day fermentation, indicating 93% utilization of the oleyl alcohol. Furthermore, no intermediate products of any kind could be detected.

Example 7.—Preparation of 7-chlorotetracycline using oleyl alcohol

Following the teachings of U.S. Pats. No. 3,050,558 and 2,875,247, the pH of three liters of 7-chlorotetracycline fermentation mash, prepared essentially as described in Example 3, but containing 2% oleyl alcohol before fermentation and no lard oil, was acidified with 50% sulfuric acid. The mash was stirred 15 minutes at room temperature, 600 grams of Celite® was added as admix and the mash was filtered through a Celite® precoat. The mash was reslurried in three liters of water and the slurry was reacidified with 50% sulfuric acid. After stirring 15 minutes at room temperature the mash was again filtered through a Celite® precoat. A 45 gram portion of oxalic acid was added to six liters of the combined acid filtrates. The calcium oxalate was precipitated at pH 1.5 followed by extraction with Arquad® and methylisobutyl ketone at pH 8.6. A 95 ml. portion of water was added to the methylisobutyl ketone extract. The pH was lowered to 0.5 with 37% hydrochloric acid. The crystals were collected and aged for 16 hours at room temperature, filtered, washed with 0.1 N hydrochloric acid and dried in vacuum at room temperature. The yield from the combined acid filtrates was 91% as opposed to 83% when fermented with lard oil.

What is claimed is:

1. In a process for the production of a tetracycline antibiotic selected from the group consisting of tetracycline, 7-chlorotetracycline, 5-hydroxytetracycline, 7-chloro-6-demethyltetracycline and 6-demethyltetracycline wherein a tetracycline antibiotic-producing strain of a species of the genus Streptomyces is cultivated in a substantally triglyceride oil-free aqueous nutrient medium containing assimilable sources of carbohydrate, nitrogen, and inorganic salts under submerged aerobic conditions, the improvement which comprises cultivating said microorganism in said medium in the presence of from about 0.1% to about 8.0% by volume of said medium of a nutrient source consisting esssentially of oleyl alcohol.

2. A process according to claim 1 wherein the tetracycline antibiotic is tetracycline and the species of Streptomyces is *S. aureofaciens*.

3. A process according to claim 1 wherein the tetracycline antibiotic is 7-chloro-6-demethyltetracycline and the species of Streptomyces is *S. aureofaciens*.

4. A process according to claim 1 wherein the tetracycline antibiotic is 5-hydroxytetracycline and the species of Streptomyces is *S. rimosus*.

5. A process according to claim 1 wherein the tetracycline antibiotic is 5-hydroxytetracycline and the species of Streptomyces is *S. platensis*.

6. A process according to claim 1 wherein the tetracycline antibiotic is 5-hydroxytetracycline and the species of Streptomyces is *S. hygroscopicus*.

7. A process according to claim 1 wherein the tetracycline antibiotic is 7-chlorotetracycline and the species of Streptomyces is *S. aureofaciens*.

8. A process according to claim 1 wherein the tetracycline antibiotic is 6-demethyltetracycline and the species of Sterptomyces is *S. aureofaciens*.

References Cited

FOREIGN PATENTS 679,087  9/1952  Great Britain.

MAURICE W. GREENSTEIN, Primary Examiner

U.S. Cl. X.R.

195—30, 80, 100, 114

UNITED STATES PATENT OFFICE
CERTIFICATE OF CORRECTION

Patent No. 3,516,909     Dated June 23, 1970

Inventor(s) Harlow Bishop

It is certified that error appears in the above-identified patent and that said Letters Patent are hereby corrected as shown below:

Column 3, line 36, "NnSO4" should read -- $MnSO_4$ --; Table I, under the heading "Concentration of tetracycline in mcg./ml." the second entry "3,105" should read -- 3,170 --; the eighteenth entry "4,923" should read -- 4,230 --; the nineteenth entry "2,500" should read -- 2,950 --. Column 4, Table II, the heading "Concentration of 7-chloro-6-dethyltetracycline in mcg./ml." should read -- Concentration of 7-chloro-6-demethyltetracycline in mcg./ml. --; line 46, "mesh" should read -- mash --. Column 6, Table V, line 3 "Filtration rat" should read -- Filtration rate --; Claim 1, lines 58-59, "substantal-" should read -- substantial- --.

SIGNED AND SEALED
OCT 13 1970

(SEAL)
Attest:

Edward M. Fletcher, Jr.
Attesting Officer

WILLIAM E. SCHUYLER, JR.
Commissioner of Patents